Figure 1:
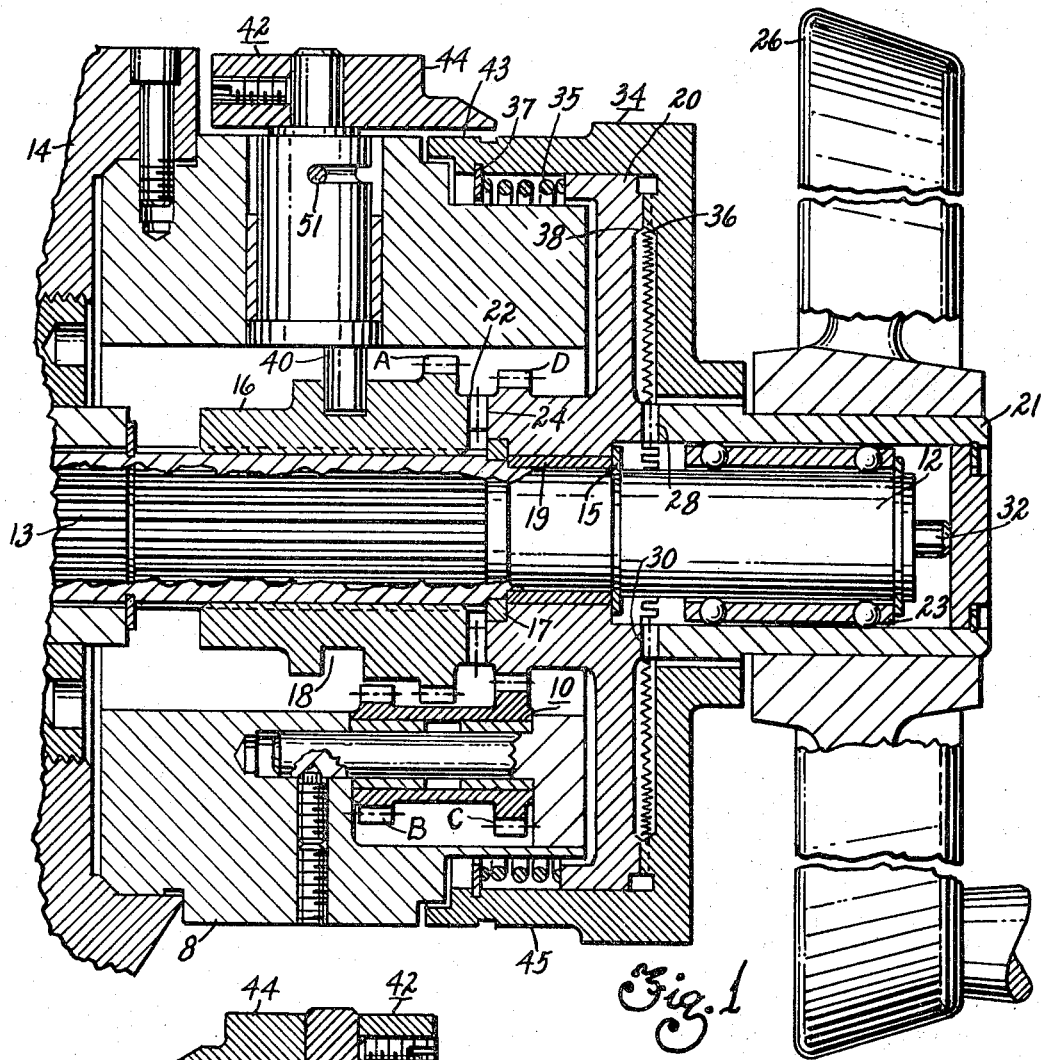

United States Patent

[11] 3,536,030

[72] Inventor Walter Schroeder
 Cincinnati, Ohio
[21] Appl. No. 744,468
[22] Filed July 12, 1968
[45] Patented Oct. 27, 1970
[73] Assignee The Cincinnati Milling Machine Co.
 Cincinnati, Ohio
 a corporation of Ohio

[54] METRIC/INCH CONVERTER
 4 Claims, 4 Drawing Figs.
[52] U.S. Cl................................................. 116/115.5,
 33/166
[51] Int. Cl.............................................. B23q 17/00
[50] Field of Search....................................... 116/133,
 124, 115, 115.5; 74/10.8, 813, 826, 827; 33/166

[56] References Cited
 UNITED STATES PATENTS
Re. 26,527 2/1969 Rabinow ..................... 116/115.5
1,027,549 5/1912 Kronert........................ 116/114X
3,418,965 12/1968 Rabinow ..................... 33/166X

*Primary Examiner*—Louis J. Capozi
*Attorney*—Howard T. Keiser and Roy T. Montgomery ABSTRACT: A metric to English converter for a machine tool. The converter has a handwheel connected to a dial which has a metric and an English set of marks thereon. An eccentric selector is used to connect the handwheel directly to the shaft or to connect it to the shaft through a gear train such that even incremental rotation is accomplished when using either English or metric units.

Patented Oct. 27, 1970

3,536,030

Sheet 1 of 3

INVENTOR.
WALTER SCHROEDER
BY
ATTORNEYS

METRIC/INCH CONVERTER

This invention relates to the field of dimensional converters for machine tools. There is a demand in today's machine tool markets for mechanisms which read selectively in either Metric or English units. Many machine tool users manufacture parts according to drawings in English units and according to drawings in Metric units. This invention eliminates the need to convert such drawings to the opposite system for manufacture of a part on a machine calibrated in that system.

Also, it is desirable that one rotation of the indicating dial indicate an even increment of the system being used. For example, in the English system it is common for one rotation of the dial to equal .250 inches. Thus, to move one inch it would require four full turns of the dial. Similarly, in the Metric system it is desirable that one full turn of the dial equal 5 millimeters. Thus, to move one centimeter it would require two full turns of the dial.

This invention provides a single dial with a first scale in the English system and a second scale in the Metric system. Each scale is calibrated to show an even increment in that system for revolution of the dial. Depending upon which system is being used, the dial is connected directly or through a motion conversion train to the driving shaft. The train is designed to automatically compensate for differences between the Metric and English systems.

In its preferred form this invention provides an indicator which automatically directs the operator to the dial of the system effective at any particular time.

Referring now to the drawings:

FIG. 1 is a section view of a mechanism of this invention in its first position. The motion conversion train 10 is shown displaced 90° out of position about shaft 12 for illustration.

Figure 2:
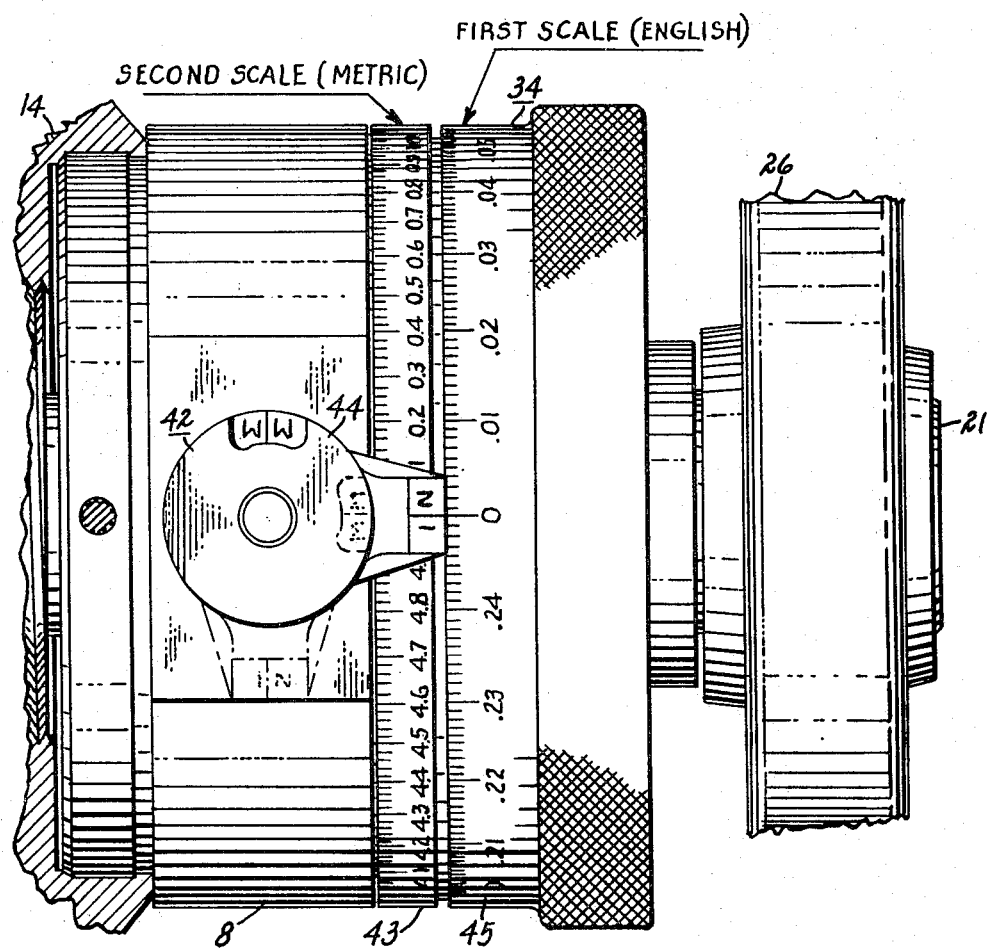

FIG. 2 is a plan view of the mechanism of this invention showing the selector 42 in its first position in solid lines and in its second position in phantom lines.

Figure 3:
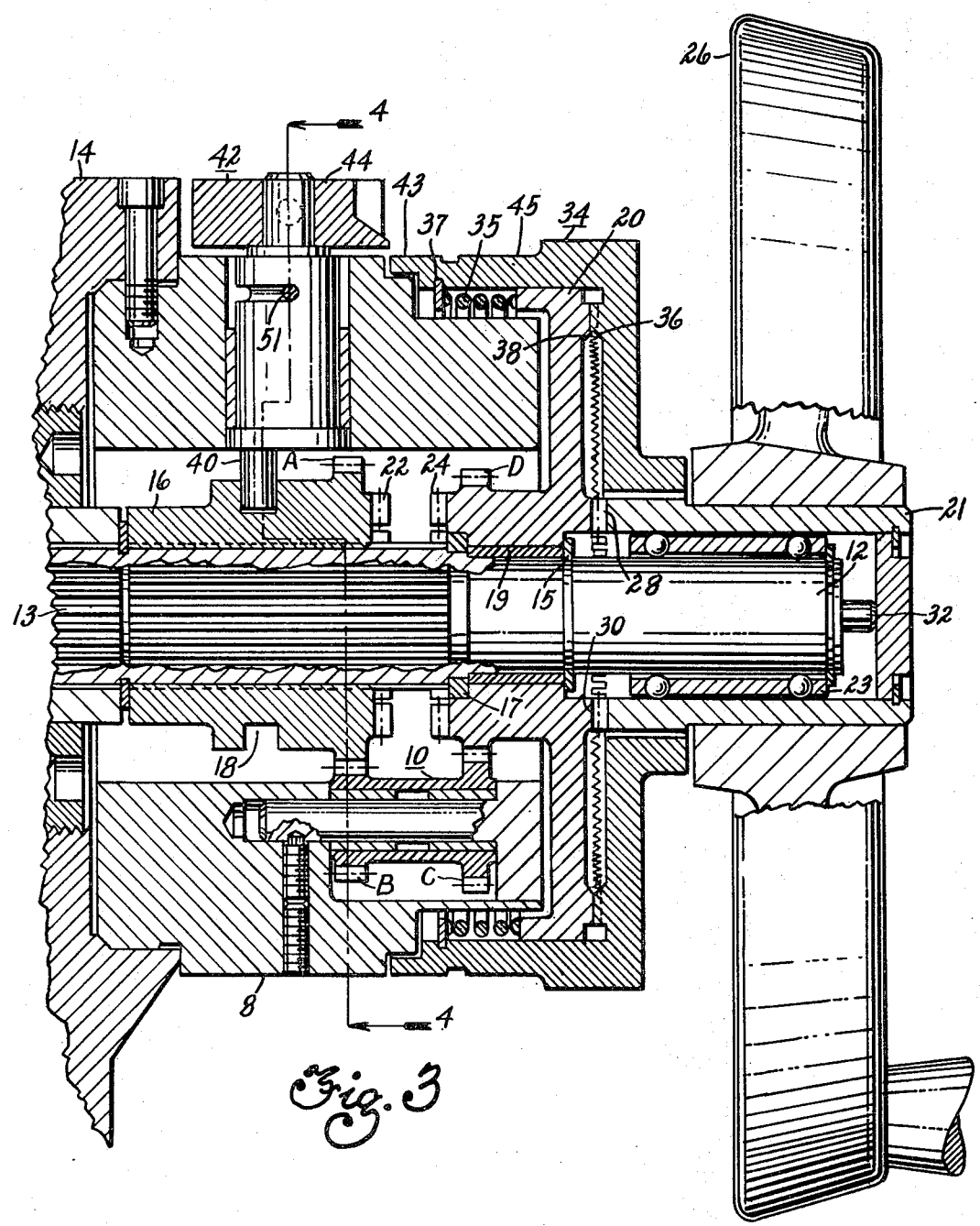

FIG. 3 is a sectional view of the mechanism of this invention in its second position. The motion conversion train 10 is shown 90° out of position about shaft 12 for illustration.

Figure 4:
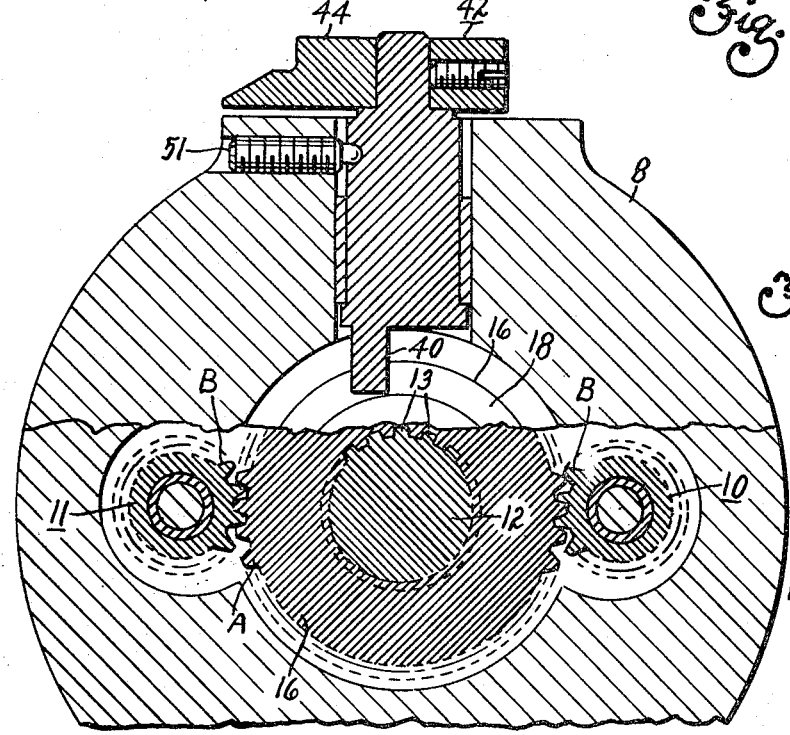

FIG. 4 is a section view along line 4–4 of FIG. 3 showing motion conversion trains 10 and 11 in their actual position.

Referring now to FIGS. 1 and 2 there is shown a part of a machine tool 14 having a driving shaft 12. Rotation of said shaft produces relative movement between one member (usually the tool which is not shown) and a second member (usually the workpiece which is also not shown) of the machine 14. Connected to the machine tool is the body 8 of the converter of this invention. A connector 16 is connected to the shaft 12 by the splines 13. Thus, the connector 16 is axially slidable on the shaft 12 but is rotatably fixed thereon. The connector 16 has an annular groove 18, a peripheral gear A, and a face clutch 22 thereon. The face clutch 22 is on the right end of the connector 16 as it is shown in FIGS. 1 and 3. An intermediate member 20 is axially fixed on the shaft 12 by means of a snap ring 15 and a shoulder ring 17. The bushing 19 between the intermediate member 20 and the shaft 12 allows free relative rotation between said member 20 and shaft 12. The member 20 has a face clutch 24 on the left end as viewed in FIGS. 1 and 3, peripheral gear D therearound, and face clutches 28 and 36 on the right end as viewed in FIGS. 1 and 3. In the first position of the converter as shown in FIG. 1 and FIG. 2 the face clutch 22 of the connector 16 is engaged with the face clutch 24 of the intermediate member 20.

A manual drive means 26 is pressed onto a bushing 21. The bushing 21 has a face clutch 30 on the left end as viewed in FIGS. 1 and 3. The bushing 21 is axially and rotatably movable with respect to the shaft 12 due to the ball bushing 23 therebetween. The manual drive means 26 is connected to the intermediate member 20 through face clutches 28 and 30.

A disengaging pin 32 is slidably received in the shaft 12. Said pin 32 is interlocked by some conventional means to the automatic controls of the machine tool 14 such that when the machine is in automatic control the pin 32 is extended to the right (as viewed in FIGS. 1 and 3) disengaging face clutches 28 and 30. This renders the manual drive means 26 inoperable and provides safety for the operator.

A dial 34 is carried on the intermediate member 20. Said dial 34 has a face clutch 38 on the left side as viewed in FIGS. 1 and 3. The dial 34 has a first scale 45 and a second scale 43 thereon. The face clutches 36 and 38 allow the dial 34 to be manually disengaged from the intermediate member 20 and zeroed in any particular relative position of the tool and workpiece. A biasing spring 35 is provided to exert pressure against the internal snap ring 37 and keeps the clutches 36 and 38 normally engaged.

A selector 42 is rotatably mounted in the body 8. The selector has an arm 40 mounted on the lower end eccentric to the axis of rotation. An indicator 44 is mounted on the end of the selector 42 opposite the arm 40. The selector 42 is locked in its first position (as shown in FIG. 1) or its second position (as shown in FIG. 3) by a conventional spring loaded detent mechanism 51.

It is clear that through the mentioned connections, the manual drive means 26 and the dial 34 are directly connected to the shaft 12 for rotation therewith. As is shown more clearly in FIG. 2, the top of the selector 42 has an indicator 44 thereon which is shielding the Metric (second) scale 43 and is indicating on the English (first) scale 45, both scales being on the dial 34.

Thus, in the first position, when the manual drive means 26 is rotated one revolution, the first scale 45 indicates a relative movement between the tool and workpiece of .250 inches. Similarly, if the machine were in automatic drive, the manual drive means 26 would be disengaged by the pin 32, and one revolution of the shaft 12 would be indicated by .250 inches (one revolution) on the first scale 45.

When the selector 42 is rotated 90°, the connector 16 is moved to the left disengaging the face clutch 22 from the face clutch 24 and engaging the peripheral gears A of the connector 16 with the peripheral gears B of the motion conversion train 10. To avoid any side thrust on the connector 16 or the shaft 12, two similar motion conversion trains 10 and 11 are provided as shown in FIG. 4. The motion conversion trains 10 and 11 are rotatably mounted in the body 8. Said trains 10 and 11 also have gears C which are in continual engagement with gear D of the intermediate member 20. In this second position it is clear that neither the manual drive means 26 nor the dial 34 rotate in unison with the shaft 12. For example, if it were desired that one revolution in the Metric system equals 5 millimeters and one revolution in the English system equals .250 inches, the ratio of gears A, B, C, and D would be A/B  C/D = 34/25  22/38.

In FIG. 2 it is seen that when the selector 42 is rotated 90° to its second position (shown in phantom lines), the Metric scale is disclosed and indicated upon by the indicator 44.

Thus, though the lead of the screw (not shown) of the shaft 12 would equal .250 inches per revolution, the Metric system could be used without sacrificing the operator's advantage of having one revolution equal an even increment in that system (5 millimeters). It is clear that the conversion could also be made in the opposite direction. That is, the direct drive could read in Metric units and the drive through the motion conversion train could be in English units. The principle would be the same.

I claim:

1. A motion read-out device for indicating the relative movement between two members of a machine in either of two sets of units comprising:
   a. a body mounted on the machine;
   b. a shaft rotatably supported on the machine and extending into said body;
   c. means operable upon rotation of said shaft for producing relative movement between said members;
   d. a dial supported on said shaft for rotation relative thereto, said dial having:
      i. a first scale reading in one set of units, and
      ii. a second scale reading in a different set of units;
   e. selectively operable driving connections between said dial and said shaft, including:
      i. a connector slidably but nonrotatably mounted on said shaft for movement to either of two positions thereon, ii. means providing a direct driving connection between said dial and said shaft in one position of said connector, and
iii. a motion converting train supported on said body for effecting a driving connection between said dial and said shaft in the other position of said connector;
f. said dial and said shaft being rotated in unison when said direct driving connection is selected, and relative movement between said machine members being indicated by said first scale; said dial and said shaft being rotated at different speeds when said motion conversion train driving connection is selected, and relative movement between said members being indicated by said second scale;
g. a manually operable selector supported on said body for movement to either one of two positions; and
h. means operatively connecting said selector with said connector for moving the latter to one or the other of its two scale selecting positions in response to manipulation of said selector.

2. The motion read-out device of claim 1 including means on said selector for indicating use of the first scale when said connector is moved to said one position and the use of the second scale when said connector is moved to said other position.

3. The motion read-out device of claim 1 including a hand wheel journaled for rotation on said shaft beyond the confines of said body, and selectively disconnectable means for connecting said handwheel to said dial to permit manual operation of the dial and the shaft.

4. The motion read-out device of claim 3 including means for positively disconnecting the hand wheel from said dial when the machine is in automatic control.

UNITED STATES PATENT OFFICE
CERTIFICATE OF CORRECTION

Patent No. 3,536,030                                              October 27, 1970

Walter Schroeder

It is certified that error appears in the above identified patent and that said Letters Patent are hereby corrected as shown below:

Column 2, lines 45 and 46, "A/B  C/D=34/25  22/38." should read -- $A/B \times C/D = 34/25 \times 22/38.$ --.

Signed and sealed this 6th day of April 1971.

(SEAL)
Attest:

EDWARD M. FLETCHER, JR.                          WILLIAM E. SCHUYLER, JR.
Attesting Officer                                        Commissioner of Patents